A. TARAUD & P. TRUCHOT.
MANUFACTURE OF SULFURIC ACID.
APPLICATION FILED AUG. 18, 1911.
1,068,021.
Patented July 22, 1913.
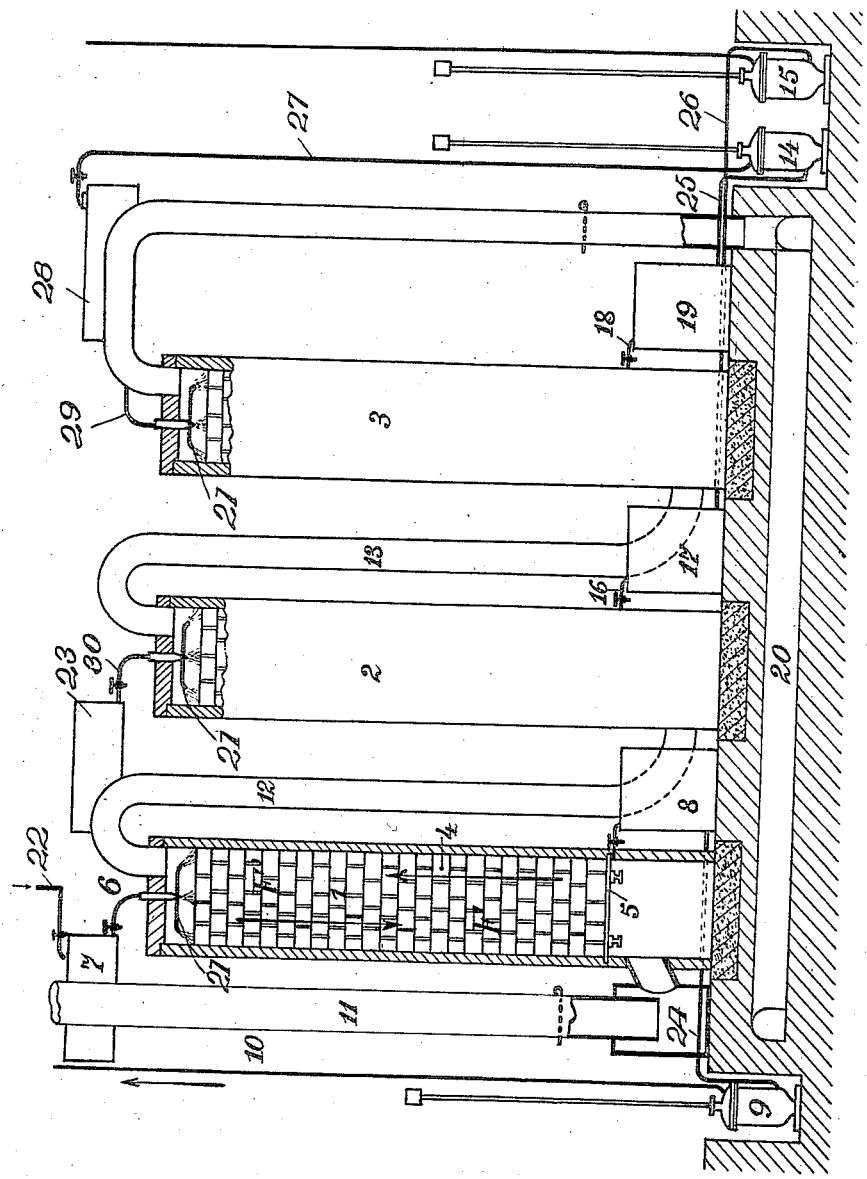
Witnesses
AM Lewers
E. M. Miles
Inventors
Albert Taraud & Paul Truchot.
Munn, Camm, Lewis & Morris
Attorneys

UNITED STATES PATENT OFFICE.

ALBERT TARAUD AND PAUL TRUCHOT, OF PARIS, FRANCE.

MANUFACTURE OF SULFURIC ACID.

1,068,021. Specification of Letters Patent. Patented July 22, 1913.

Application filed August 18, 1911. Serial No. 644,836.

*To all whom it may concern:*

Be it known that we, ALBERT TARAUD and PAUL TRUCHOT, both citizens of the French Republic, and both residents of 28 Rue de Châteaudun, Paris, France, have invented a new and useful Improvement in the Manufacture of Sulfuric Acid, which improvement is fully set forth in the following specification.

The present invention has for its object improvements in the process for the recovery of the nitrogen products hitherto lost and unemployed, resulting from the manufacture of sulfuric acid by the lead chamber process.

Heretofore the residuary gases produced in the manufacture of sulfuric acid by the lead chamber process have been washed by an alkaline solution, and especially by a solution of carbonate of soda. As already known, these gases contain nitric oxid, nitrogen peroxid and sometimes nitric oxid. In these residuary gases, nitrogen peroxid is always present in a more or less important quantity according to the excess of oxygen present. Now this substance has a regularly increasing vapor tension and it is much less soluble in sulfuric acid than nitrous acid ($N_2O_3$ or nitrogen trioxid); consequently the washing action which takes place in the Gay-Lussac towers is quite insufficient, and further when large quantities of nitrogen compounds are given off a large quantity of nitrogen peroxid may also be produced which is not recovered by the Gay-Lussac towers. Washing with alkali allows on the contrary the total amount to be recovered in the form of a mixture of nitrate and nitrite of soda in molecular proportions.

When nitric oxid is produced (which is due to lack of oxygen in the gases) oxygen is introduced before entry into the first tower and after exit from the Gay-Lussac towers so as to transform the nitric oxid into nitrogen peroxid, which will be absorbed and will combine with the alkaline solution according to the reaction:

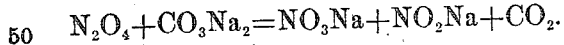

$N_2O_4 + CO_3Na_2 = NO_3Na + NO_2Na + CO_2$.

In this case the introduction of oxygen is absolutely essential. Experience has shown that the oxidation of the nitric oxid takes much longer than is generally believed; it requires a very large excess of oxygen and prolonged contact. The quantity of oxygen necessary is often much greater than the amount which exists in the lead chambers (from 5 to 6%).

The residuary gases always contain appreciable quantities of sulfuric acid mechanically carried over by the violence of the gaseous stream. These quantities may reach several hundreds of kilograms daily of sulfuric acid at a strength of 53° Baumé, heretofore lost in the alkali washings. In order to retain this acid, which is prejudicial to the efficient working of the process, the residuary gases are first washed with water in one or two brick or lead towers provided in the interior with perforated bricks, stone, rings, ordinary bricks, or any other substances which are not attacked by dilute acids and which are capable of offering a very large contact and absorption surface. These towers are provided with a device which furnishes a sufficiently large sprinkling of water to retain the sulfuric acid which has been carried over, the sprinkling operation being effected by an arrangement similar to that employed for the Gay-Lussac or Glover towers, or by a hydraulic reaction wheel made either of lead or of some pure metal. The acid-impregnated water thus collected by which the plant for the recovery of the products benefits, may have a strength of from 5 to 10° Baumé; it is reintroduced into the lead-chambers as fast as it is produced. After washing with water the gases can be treated by contact with a mass of lime or carbonate of lime so as to retain the last traces of sulfuric acid. The gases thus purified and cooled are next subjected to a washing with alkali in the usual manner by operating methodically so as to obtain solutions rich in nitrate and nitrite of soda which are reintroduced as fast as they are produced into the lead chambers as the source of nitrous products.

The accompanying drawing shows a diagrammatic vertical section of the apparatus which serves for carrying the process, which is the object of this invention, into effect.

This apparatus is composed essentially of a plurality of towers, 1, 2, 3. The first of these towers 1 serves to eliminate and to recover the sulfuric acid contained in the residuary gases. This tower is made of lead or brick; in the latter case the lower portion is provided up to the overflow level with a lead lining 2½ millimeters in thickness; it is provided in the interior with perforated bricks or stone rings 4 offering a very large absorption surface and arranged in the form of a baffle and resting on an iron grill 5 provided in the masonry of the tower and itself covered with lead in order to resist attack by the dilute acid.

Water, under a sufficient pressure is fed into the tower, in order to operate a distributing device 21 which allows of easily sprinkling the whole section of the tower; this device can be of lead or pure metal. A reservoir 7 supplied with water through pipe 22 serves for feeding the tower. The distribution can be effected in the same manner as in a Gay-Lussac tower by several inlet pipes provided with water sealed joints.

The acid-impregnated water obtained from the bottom of the tower 1 is collected in a reservoir 8 from which it is drawn through a pipe 24 by a pulsometer 9 or a pump and forced back through the pipe 10 to the top of the lead chambers where it is finely divided. The flow from the tower 1 is regulated so as to furnish the quantity of water necessary for feeding the lead chambers during one day.

The residuary gases coming from the Gay-Lussac tower by the pipe 11 enter at the bottom of the acid-retaining tower 1 and come into contact during their ascent in the direction of the arrow F, with water trickling from the upper portion in the direction of the arrow F¹. These residuary gases thus deprived of the sulfuric acid which they may have contained then pass through the lead pipes 12 and 13 to the two alkali towers 2 and 3.

In order to effect a thorough washing of the gases and to extract the whole of the sulfuric acid carried over, two alkali towers may be used similar to the tower 1.

The two alkali towers 2 and 3 are constructed in the same manner as the tower 1 of brick and are supplied with alkali solution through spraying devices 21 from alkali tanks 23, 28 through pipes 30, 29. The gases also circulate in the opposite direction to the flow of the alkaline liquids (which consist, for example, of solutions of carbonate of soda) and combine with them in order to allow of the formation of nitrate and nitrite of soda.

The system of distribution is the same as that applied in the acid-retaining tower 1. The towers 2 and 3 are fed methodically and furnish a nitrated liquid which in the case of tower 2 is delivered to reservoir 17 through valved pipe 16 from which it is taken through pipe 26 to pulsometer 15 and delivered to the top of lead chambers through suitable spraying devices, while the discharge from tower 3 is delivered through valved pipe 18 to reservoir 19, preferably to be returned to the tower 3 through pipe 25, pulsometer 14, pipe 27 and reservoir 28 before passing to the lead chambers.

The residuary gases after passing through the whole system hereinbefore described are finally purified and conducted into channels 20 communicating with the main flue.

The liquids recovered are reintroduced in a continuous manner at the top of the lead chambers, the alkali-impregnated water fed into the towers corresponding in amount to the daily consumption. This reintroduction of the liquids from the towers 2 and 3, which allows of the total recovery of the nitrous gases is essentially characteristic of the invention.

It will be understood that the application of the means described, in the French Patent No. 425,913 as in the present specification allows the following results to be obtained which had not hitherto been effected: 1. The gases in the lead chambers, which contain nitrous acid, nitrogen peroxid and nitric oxid (mixed with sulfuric acid, oxygen and nitrogen) are recovered, the nitrogen peroxid and the nitric oxid not being retained in the Gay-Lussac towers by the washing processes actually in use. 2. Even with an apparatus which tends to produce large quantities of nitrous products or an apparatus which works irregularly, the recovery of the nitrous products takes place under good conditions. 3. The lead chambers benefit by the more regular method of working owing to the continuous introduction of nitrous products which are already in a low state of oxidation, and which can immediately be disposed of. 4. The employment of the process creates a new source of profit by the use of the water impregnated with sulfuric acid which is collected during the preliminary washing of the gases, this acid-impregnated water being reintroduced into the lead chambers.

Claim—

1. The process of recovering oxids of nitrogen from gases resulting in the manufacture of sulfuric acid by the lead-chamber process consisting in subjecting said gases to water to remove sulfuric acid therefrom, returning the resulting acid solution to a previous stage of the sulfuric acid making process and subjecting the gases so treated to the action of an alkali solution to remove oxids of nitrogen therefrom and produce nitrogen compounds with the alkali.

2. The process of recovering oxids of nitrogen from gases resulting in the manufacture of sulfuric acid by the lead-chamber process consisting in subjecting said gases to water to remove sulfuric acid therefrom, returning the resulting acid solution to a previous stage of the sulfuric acid making process and subjecting the gases so treated to the action of an alkali solution to remove oxids of nitrogen therefrom and produce nitrogen compounds with the alkali, and returning the resulting nitrated solution to a previous stage in the sulfuric acid making process.

3. The process of recovering oxids of nitrogen from gases resulting from the manufacture of sulfuric acid by the lead-chamber process, consisting in introducing oxygen into said gases to react with any nitric oxid present therein, subjecting said gases to water to remove sulfuric acid therefrom, returning the resulting acid solution to a previous stage of the sulfuric acid making process and subjecting the gases so treated to the action of an alkali solution to remove oxids of nitrogen therefrom and produce nitrogen compounds with the alkali.

4. The process of recovering oxids of nitrogen from gases resulting from the manufacture of sulfuric acid by the lead-chamber process, consisting in introducing oxygen into said gases to react with any nitric oxid present therein, subjecting said gases to water to remove sulfuric acid therefrom, returning the resulting acid solution to a previous stage of the sulfuric acid making process and subjecting the gases so treated to the action of an alkali solution to remove oxids of nitrogen therefrom and produce nitrogen compounds with the alkali, and returning the resulting nitrated solution to a previous stage in the sulfuric acid making process.

In testimony whereof we have signed this specification in the presence of two subscribing witnesses.

ALBERT TARAUD.
PAUL TRUCHOT.

Witnesses:
 H. C. COXE,
 MIGUEL ZEROLO.